June 7, 1949.  S. J. A. CHRISTIE  2,472,570
WORK-SUPPORTING ADJUSTABLE MANDREL FOR BAND SAWS
Filed Aug. 11, 1944  3 Sheets-Sheet 1

INVENTOR
S.J.A.CHRISTIE
BY
ATTYS

June 7, 1949. S. J. A. CHRISTIE 2,472,570
WORK-SUPPORTING ADJUSTABLE MANDREL FOR BAND SAWS
Filed Aug. 11, 1944 3 Sheets-Sheet 2

INVENTOR
S.J.A. CHRISTIE
BY
ATTYS

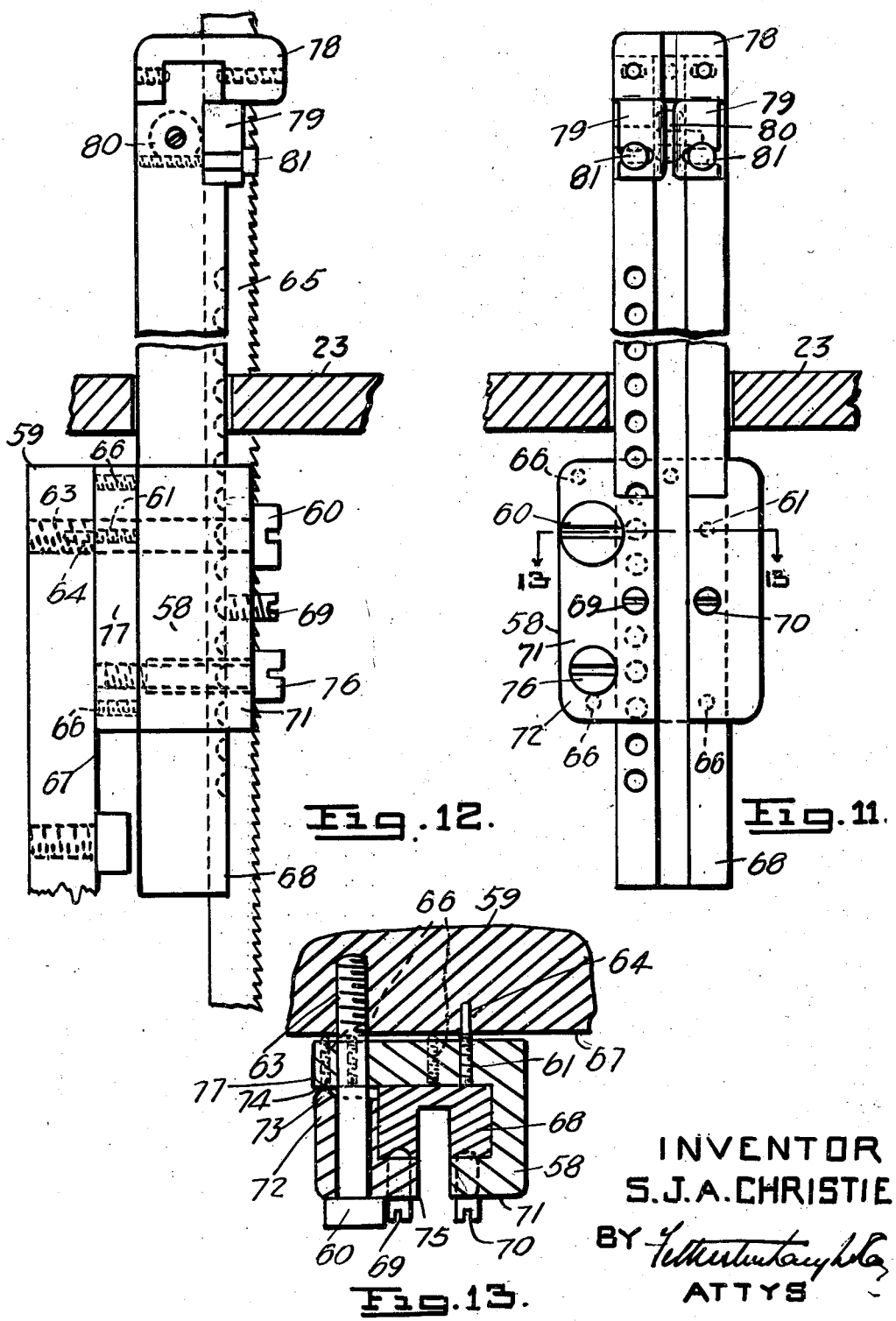

Patented June 7, 1949

2,472,570

UNITED STATES PATENT OFFICE 2,472,570

WORK-SUPPORTING ADJUSTABLE MANDREL FOR BAND SAWS

Stanley J. A. Christie, Oshawa, Ontario, Canada

Application August 11, 1944, Serial No. 549,102

2 Claims. (Cl. 143—132)

The invention relates to an adjustable mandrel for band saws and the like.

It is an object of this invention to provide a mandrel unit for band saws and the like having pedestal means on which a work-piece may be swingably supported during the cutting operation.

It is also an object of this invention to provide a mandrel unit for band saws and the like which is easily and quickly removed or secured to the work table or machine frame of an existing machine and which is adjustable as to position on such work table or machine frame.

It is a further object of this invention to provide an adjustable mandrel unit for band saws and the like having reciprocable pedestal means on which swingably to support a work-piece during cutting.

It is also a further object of this invention to provide a pedestal mandrel unit for band saws and the like having a head portion on the pedestal which is fully adjustable in all dimensions and includes rotatable support means and guide means for the band saw.

A further object of this invention is to provide a pedestal mandrel unit for band saws and the like having a movable chassis reciprocable within a housing securable to a machine frame, the said housing including a fulcrumed member to lock said chassis in predetermined position in said housing.

Present day band saw machines, whilst sometimes having meaens thereon for preventing saw-chatter or vibration, are in general ill adapted for properly supporting work-pieces during the cutting operation itself.

The work support meaens now in general use consists of the flat work table of the machine and to those skilled in the art it is well known that the task of cutting curved or recessed material, even in sheet form, is often a dangerous and wasteful operation demanding long experience and greata skill on the part of the operator, the results, notwithstanding, being always uncertain and generally far from accurate.

Moreover, work-pieces having projecting portions which must be accurately cut for such work as jigs and fixtures, must, on existing machines, be very carefully supported by blocks or other means and despite great care and the spending of much time to build and secure such supports, it all too frequently happens that the vibration of the machine shakes them out of position during cutting, even when they are clamped, and faulty cutting necessarily results.

It will be evident that existing support structures for use in band sawing operations are generally inefficient and dangerous to the operator and in order to remedy these prevalent conditions the instant invention was devised.

In the drawings:

Figure 11 is a front elevational view of a modified fully adjustable mandrel unit, Figure 12 is a side elevational view of Figure 11, Figure 13 is a sectional view on the line 13—13 in Figure 11.

Figure 1:
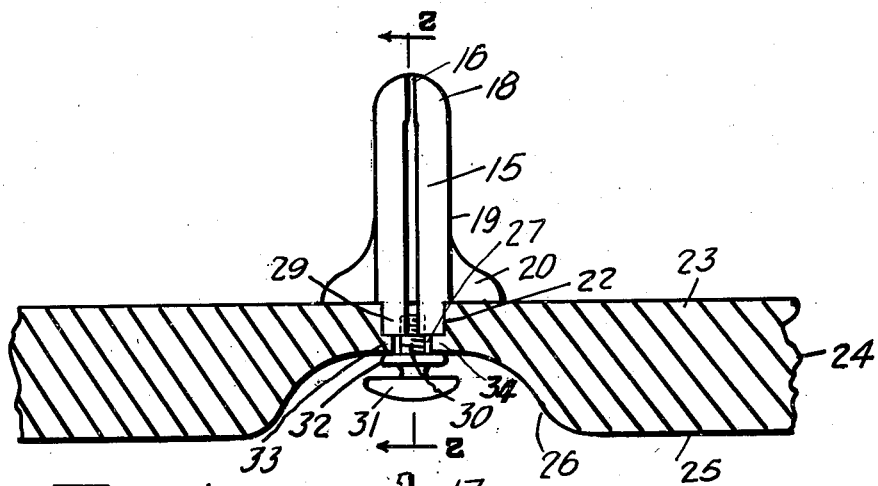
Figure 1 is a front elevational view of a mandrel unit according to the invention, secured to a machine table, the latter being shown in section.
Figure 2:
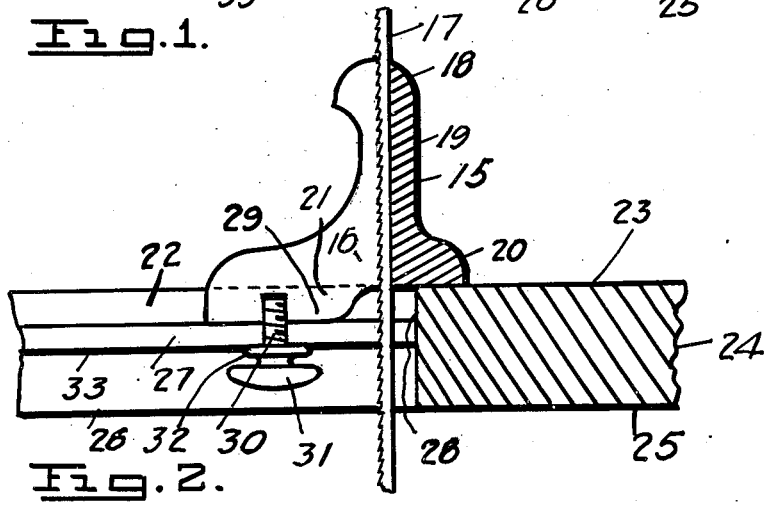
Figure 2 is a sectional view on the line 2—2 in Figure 1.

Referring to the drawings, it will be seen from Figures 1 and 2 that the invention in the simplest form generally comprises the pedestal 15 having a vertical slotted portion 16 therein to contain and guide the band saw 17. The pedestal is provided with a head portion 18 which may be of any convenient form, the shank portion 19 terminating in flanged portions 20 which form support means to maintain the pedestal upright on the machine table.

The pedestal preferably includes a lower projecting portion 21 designed to be secured in the upper recess 22 in the work table 23 of the machine frame 24. The under surface 25 of the work table is formed with a large recess 26 therein having the cut out slot 27 extending from the front portion of the work table to a point 28 rearwardly of the saw 17. In the lower central portion 29 of the pedestal is located a securing member 30 having the manual gripping portion 31 and the annular flange 32 reciprocably engageable with the adjacent flanged parts 33 and 34 of the work table formed between the upper and lower recesses by the slot 27.

It will be evident that after seating the rear portion 20 on the work table in the desired position and by manually screwing the member 31, the head portion of the pedestal forms a support means for a flat or curved work-piece which may be swung thereon to enable any desired shape to be cut from the work-piece.

It is evident that the pedestal may be moved forwardly or rearwardly relative to the saw within the limits of the slot 16 and may be secured in a desired position by the member 31.

Figure 3:
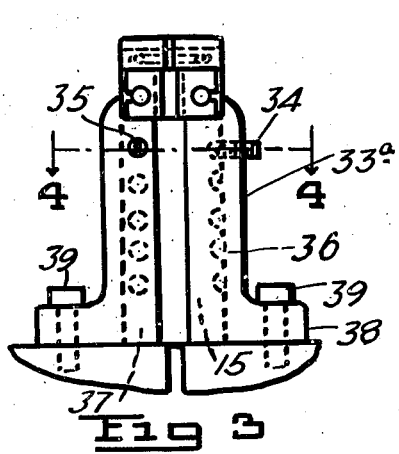
Figure 3 is a front view of a modified mandrel unit having an adjustable head portion and a reciprocable pedestal.
Figure 4:
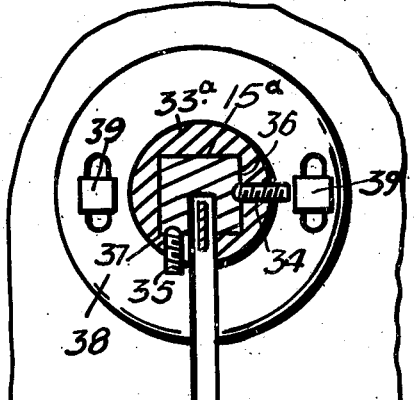
Figure 4 is a sectional view on the line 4—4 in Figure 3.

As seen in Figures 3 and 4, the pedestal may be formed as a member 15ᵃ axially reciprocable within a housing 33ᵃ being positionable therein by set screws 34ᵃ and 35 engageable respectively with different faceted portions 36 and 37 of the pedestal. The housing is provided with an annular flange 38 adjustably securable to the work table by the members 39.

Figure 5:
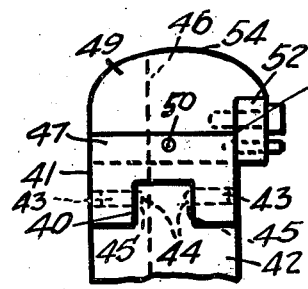
Figure 5 is a side elevational view of a modified pedestal head.
Figure 6:
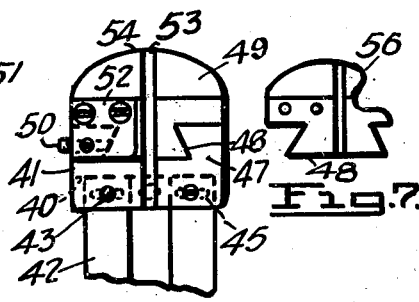
Figure 6 is a front elevational view of Figure 5.

Figures 5 to 10 inclusive illustrate alternative types of adjustable heads which may be secured to the upper extremity 42 of the reciprocable pedestal. In Figures 5 and 6 the pedestal head 41 has a transverse recess 40 securable to the corresponding extremity of the pedestal by the members 43. The inner extremities 44 of members 43 are seated in adjacent depressions 45 which permit transverse adjustment of the head. The pedestal head 47 is provided with the ways 48 on which the crown piece 49 is movable, being secured therealong by the set screw 50. To the front surface 51 of the crown piece is secured the stop member 52 located on one side of the slot 53 which extends from the apex 54 of the crown piece and through the front of the member 47, the stop member being rigidly securable by a screw and provided to prevent the crown piece leaving the ways and to prevent the rear 46 of the slot from coming into contact with the rear wall of the saw by inadvertent sliding movement of the crown piece.

Figures 7, 8:
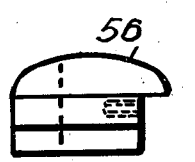
Figure 7 is a front elevational view of an alternative type of pedestal head.
Figure 8 is a side elevational view of Figure 7.

In the alternative form of movable crown-piece illustrated in Figures 7 and 8, the upper surface 56 is formed with an S-curve to enable certain types of curved work-pieces to be more completely swingably and angularly supported thereon.

Figure 9:
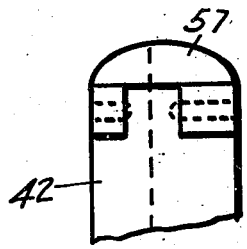
Figure 9 is a side elevational view of a modified pedestal head.
Figure 10:
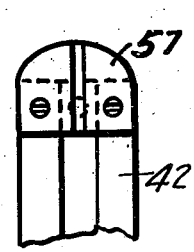
Figure 10 is a front elevational view of Figure 9.

Figures 9 and 10 illustrate a simple domed and slotted crown-piece 57 securable directly to the extremity of the pedestal and adapted for use preferably on the type of pedestal illustrated in Figures 3 and 4.

For precision work, the fully adjustable mandrel, as shown more particularly in Figures 11 to 13 inclusive, is provided comprising the housing 58 securable to a machine frame 59 by the member 60 and the pin 61 engageable respectively with the threaded aperture 63 and the orifice 64 in the machine frame.

In order accurately to align the housing 58 to the saw 65, the adjustable pins 66 are provided in the housing, their extremities bearing up against the surface 67 of the frame. As best seen in Figure 13 the housing is formed as a U-shaped member having a central guideway in which is reciprocable the U-shaped chassis 68 of the pedestal. The chassis is positionable in relation to the housing by the members 69 and 70, the latter being threadedly secured through the front portion 71 of the housing and being engageable with the front of the U-shaped chassis 68.

In order rigidly to lock the chassis to the housing 58 after positioning, the L-shaped member 72 is provided. This member, best seen in Figure 13, has a raised portion 73 adjacent to and bearing on the inner surface 74 of the housing. The fulcrumed member 72 is formed with a retaining flange portion 75, the inner surfaces of which are engageable with the reciprocable chassis 68. Member 72 is orificed to contain members 60 and 76 and is securable by leverage exerted through the threaded member 76, the extremity of which is secured in the rear part 77 of the housing 58, as best seen in Figure 12.

The upper end of the pedestal may be provided with any of the alternative types of head member and as illustrated includes the slotted and movable crown-piece 78 having the adjustable slotted saw guides 79 disposed on both sides of the slot and securable by the members 81. In addition, a rotatable member 80 is secured in the member 68 to support the saw during movement.

It will be evident that an adjustable mandrel for band saws and the like has been provided which fully meets the objects to be attained and that changes or modifications may be made to the preferred embodiments described herein within the scope and nature of the appended claims.

What I claim as my invention is:

1. A mandrel for band saws and the like comprising a housing, means for securing said housing to a band saw table, set screw means for aligning said housing with the saw blade, a chassis adapted to carry a pedestal for supporting the work, said pedestal having a head and means for adjusting said head in a horizontal plane along a line aligned with said blade and along a line perpendicular to said aligned line.

2. A mandrel for band saws and the like as claimed in claim 1, in which said means for aligning the housing with the saw blade comprises a plurality of spaced apart screws adapted to thread in said housing and to bear against said table at spaced apart intervals for the purpose of aligning the housing with the saw blade.

STANLEY J. A. CHRISTIE.

REFERENCES CITED

The following references are of record in the file of this patent:

UNITED STATES PATENTS

| Number | Name | Date |
|---|---|---|
| 142,361 | Walker | Sept. 2, 1873 |
| 392,118 | Hammond | Oct. 30, 1888 |
| 395,797 | Perry | Jan. 8, 1889 |
| 502,887 | Griffin | Aug. 8, 1893 |
| 758,619 | Culpepper | May 3, 1904 |